United States Patent [19]
Vigesaa et al.

[11] Patent Number: 5,275,129
[45] Date of Patent: Jan. 4, 1994

[54] PORTABLE AUTOMATIC ANIMAL FEEDING SYSTEM

[76] Inventors: T. Loren Vigesaa, Rt. 2, Box 52, Cooperstown, N. Dak. 58425; Steven T. Vigesaa, 1222 Concord Ct., Wahpeton, N. Dak. 58075

[21] Appl. No.: 846,692

[22] Filed: Mar. 6, 1992

[51] Int. Cl.⁵ .............................................. A01K 5/00
[52] U.S. Cl. ........................ 119/51.11; 119/57.2; 119/57.7
[58] Field of Search ............ 119/53, 51.11, 57.7, 119/57.2, 56.2, 57.1

[56] References Cited

U.S. PATENT DOCUMENTS

| | | | |
|---|---|---|---|
| 3,119,526 | 1/1964 | Sutton | 119/56.2 |
| 3,139,862 | 7/1964 | Rutten et al. | 119/57.7 |
| 3,678,902 | 7/1972 | Ruth | 119/51.11 |
| 4,665,862 | 5/1987 | Pitchford | 119/51.11 |
| 4,989,547 | 2/1991 | Eaton | 119/51.11 |

FOREIGN PATENT DOCUMENTS 899024  1/1982  U.S.S.R. .............................. 119/57.2

*Primary Examiner*—John G. Weiss

[57] ABSTRACT

A battery powered portable automatic animal feeding system for dispensing relatively finely divided dry feed material particularly suitable for domesticated animals such as cattle, hogs, or sheep; or for undomesticated animals such as deer. At predetermined feeding times and of predetermined quantities during each feeding time a single auger conveyor rotates and substantially uniformly and simultaneously along its entire length discharges feed material through a series of feed exit ports evenly spaced longitudinally along the bottom of an elongated tapered feed storage container and onto an existing flat feeding surface or feed bunk of variable height allowing animals access to the feed material on both sides of the feeding surface.

1 Claim, 2 Drawing Sheets

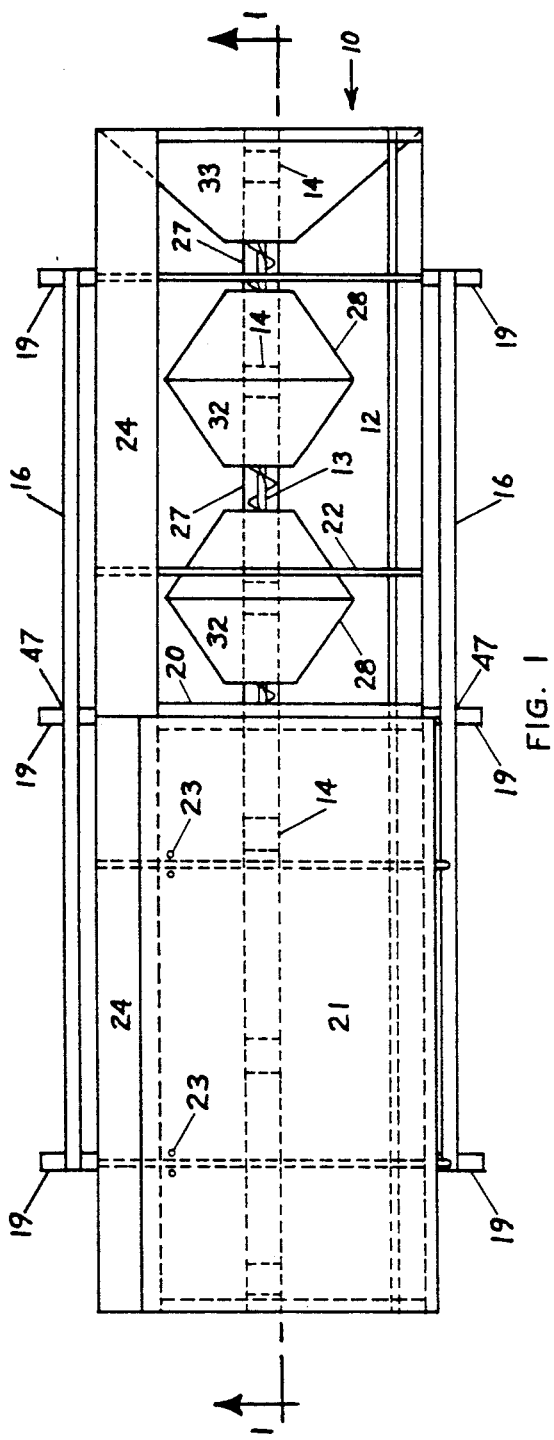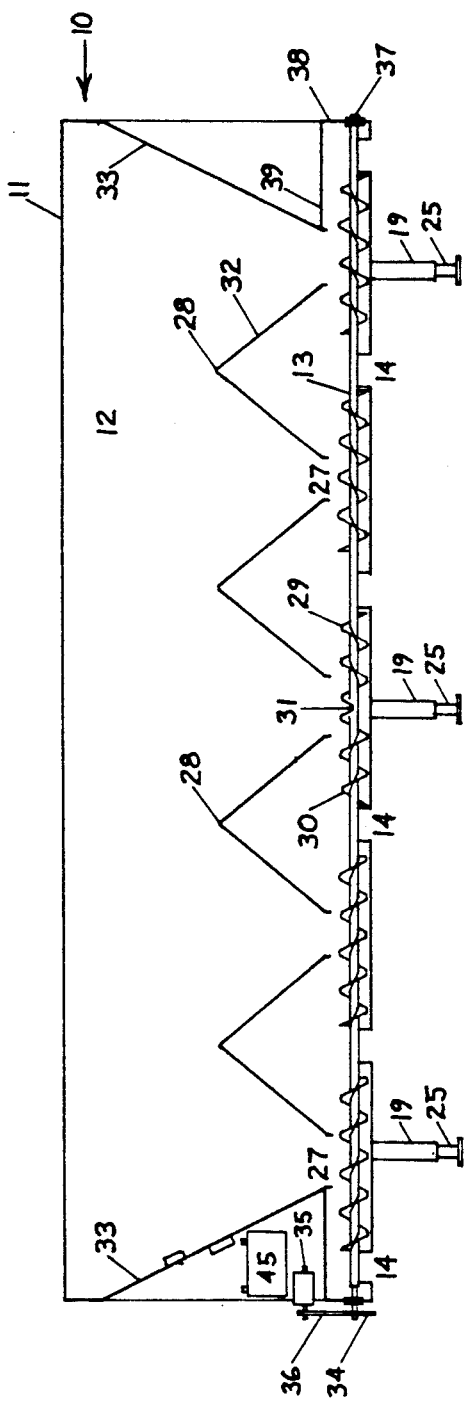

PORTABLE AUTOMATIC ANIMAL FEEDING SYSTEM

This invention relates generally to animal feeding systems and more particularly to battery powered electrically operated automatic systems relying upon presently available timer controls for regulating feeding intervals and feed quantities determined in advance. It further relates to animal feeding systems which are easily moved from one location to another. Electrically operated portable feeding systems and timer controlled automatic feeding systems are known. For example, U.S. Pat. No. 3,180,315 (Apr. 27, 1965) shows an electrically operated auger feed delivery system with a timer controlled dumping of accumulated feed into stock pens. Also, a portable system shown in U.S. Pat. No. 4,932,361 (Jun. 12, 1990) is an apparatus requiring an external electrical power source.

SUMMARY OF THE INVENTION

According to the present invention a battery powered method of feeding animals includes a feed storage means disposed in structural relation to a feed dispensing means coupled to a control means for the intermittent application of power to a power transmitting means coupled to a conveyor means for the carrying of feed material from a plurality of feed entry ports located within said feed storage means and the subsequent substantially uniformly discharging of feed material simultaneously end to end through adjacent feed exit ports spaced longitudinally along the bottom of said feed storage means and onto a feeding surface located below said feed exit ports at selected feeding times by entered input means such as recycling timers. The quantity of feed material discharged at each feeding time is predetermined by selecting the duration of conveyor run entered by like input means.

An object of the invention is to overcome the shortcomings and limited applications of known animal feeding systems.

A main object of the invention is to provide an automatic feeding system powered by a storage battery of 12-volt direct current capable of dispensing predetermined quantities of grain or other finely divided dry feed material at predetermined feeding times in remote locations wherein no external electrical power is available such as on rangeland for the supplemental feeding of cattle, hogs, or sheep.

Another object of the invention is to construct a portable feeding apparatus to allow for movement from one location to another. For example, movement from summer or fall seasonal use on rangeland to winter season feeding in feedlot.

Another object of the invention is to provide height adjustment capability for use over existing flat feeding surfaces or variable height feed bunks wherein animals may consume feed from both sides of the feeding surface.

A further object of the invention is to include an elongated feed storage container as a main part of the construction with a substantial feed capacity.

Still another object of the invention is to provide for the placement of feed directly upon the ground if desirable in certain feeding scenarios such as for deer and like wildlife.

Another object of the invention is to place the feed longitudinally in substantially uniform individual piles equally spaced and simultaneously discharged end to end along the entire feeding surface directly below the feeding apparatus. This method of placement would allow an optional single station feeding of animals with the use of partitions between each feed pile.

Yet another object of the invention is to provide an economical, reliable, and very simply constructed and efficiently operational apparatus with rugged features able to withstand the severe weather encountered in remote areas as well as the abuse of large stock animals.

A further object of the invention is the provision for modification in the embodiment of the apparatus wherein optional application features may easily be imported into this invention. For example, additional "slave" units may be coupled onto a "master" unit for increased feeding capacity, removeable wheels and hitch may be installed for transport, partitions in the feed storage container may be placed wherein one or more feed entry ports would be closed, a solar charger may be installed for maintaining charge to the 12-volt D.C. battery, or other voltages may be used in the electrical assembly, e.g., 120-volt A.C.

For a better understanding of these and other advantages and objects of the invention, the accompanying drawings and detailed description of an illustrative preferred embodiment are hereinafter set forth pointing out the construction and various operational characteristics, while features of novelty are more particularly described in the annexed claims.

BRIEF DESCRIPTION OF THE DRAWING

FIG. 1 is a top view of an automatic animal feeding apparatus according to the invention;

FIG. 2 is a sectional side view of the apparatus in FIG. 1 as seen along line 1—1;

DETAILED DESCRIPTION OF THE DRAWING

Figure 4:
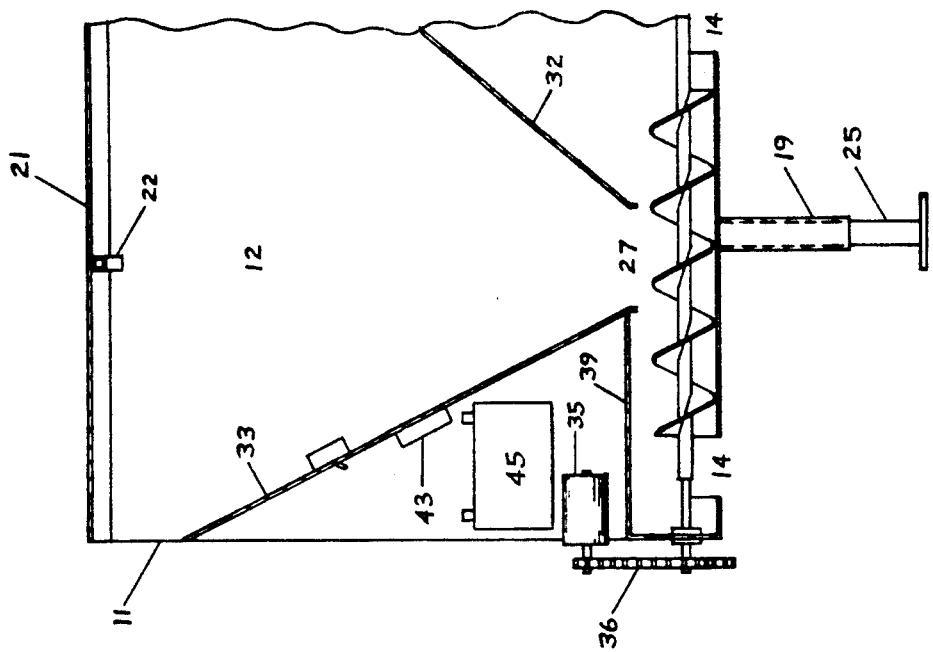
FIG. 4 is an enlarged fragmentary view of the drive end in FIG. 2, sectional as seen along line 2—2 in FIG. 3.

Construction material mentioned in the following detailed description of the preferred embodiment of the invention is well known and is for example only.

FIG. 1 is a top view of an automatic animal feeding apparatus 10 indicating an elongated feed storage hopper 11 of galvanized steel with sloping side walls 12 sloped downward toward a center at the bottom and formed to contain an auger conveyor assembly 13 with a plurality of spaced feed exit ports 14 cut through end to end beneath auger conveyor assembly 13.

The feed storage hopper 11 is supported in an elevated position by a stand 15 cross braced horizontally with angle iron 16 and bolted to both sides of the sloping side walls 12 of the feed storage hopper 11 through angle irons 17 and 18 (FIG. 3) with a plurality of main support legs of square steel tubing 19 angled outwardly from the vertical for increased stability and extending to ground or floor level. Main support legs 19 are adjustable for desired height over an existing feeding surface such as a conventional feed bunk (not shown) below the feed storage hopper 11 with telescoping square steel tubing 25 (FIG. 3) and locked into place with set bolts at 26. The height adjustment is of sufficient clearance over a feeding surface to allow animals convenient access to the feed material dispensed onto the feeding surface.

The feed storage hopper 11 of FIG. 1 is covered, for example, by hinged sliding covers 21 obvious to those skilled in the art, with a supporting channel iron member 20 between the covers 21. Cross members 22 provide additional cover support and sliding cover U-bolt 23 hold down track. Edge covers 24 are fixed along side opposite hinged side of sliding covers 21. A top view of hood covers 28 are shown centered above feed exit ports 14 and corresponding sections of conveyor assembly 13 in FIG. 2.

As shown in FIG. 2, the feed storage hopper 11 contains a dispensing means including a plurality of feed entry ports 27 of exposed conveyor assembly 13 between hood covers 28, a conveyor assembly 13 including left hand auger flighting 29 and right hand auger flighting 30 beginning at the center of a center feed entry port 31, and a plurality of hood covers 28 with sloping cross walls 32 attached to sloping side walls 12 of the feed storage hopper 11 centered over feed exit ports 14 to prevent leakage of feed material through feed exit ports 14 during conveyor stop interval. End hood covers 33 also serve as sloping end walls for the feed storage hopper 11 (see also FIG. 4).

The power transmitting means begins at the electrical motor 35 with a drive chain 36 coupled to a drive sprocket 34 at one end of the conveyor assembly 13. The opposite end of the conveyor assembly 13 includes an extension shaft 37 for the optional coupling on of additional "slave" feeder units onto the "master" unit for increased feeding capacity. The conveyor assembly 13 is journaled to both ends of the feed storage hopper 11 at the vertical end plate 38 of the horizontal conveyor assembly end cover 39 (see FIG. 4).

Figure 3:
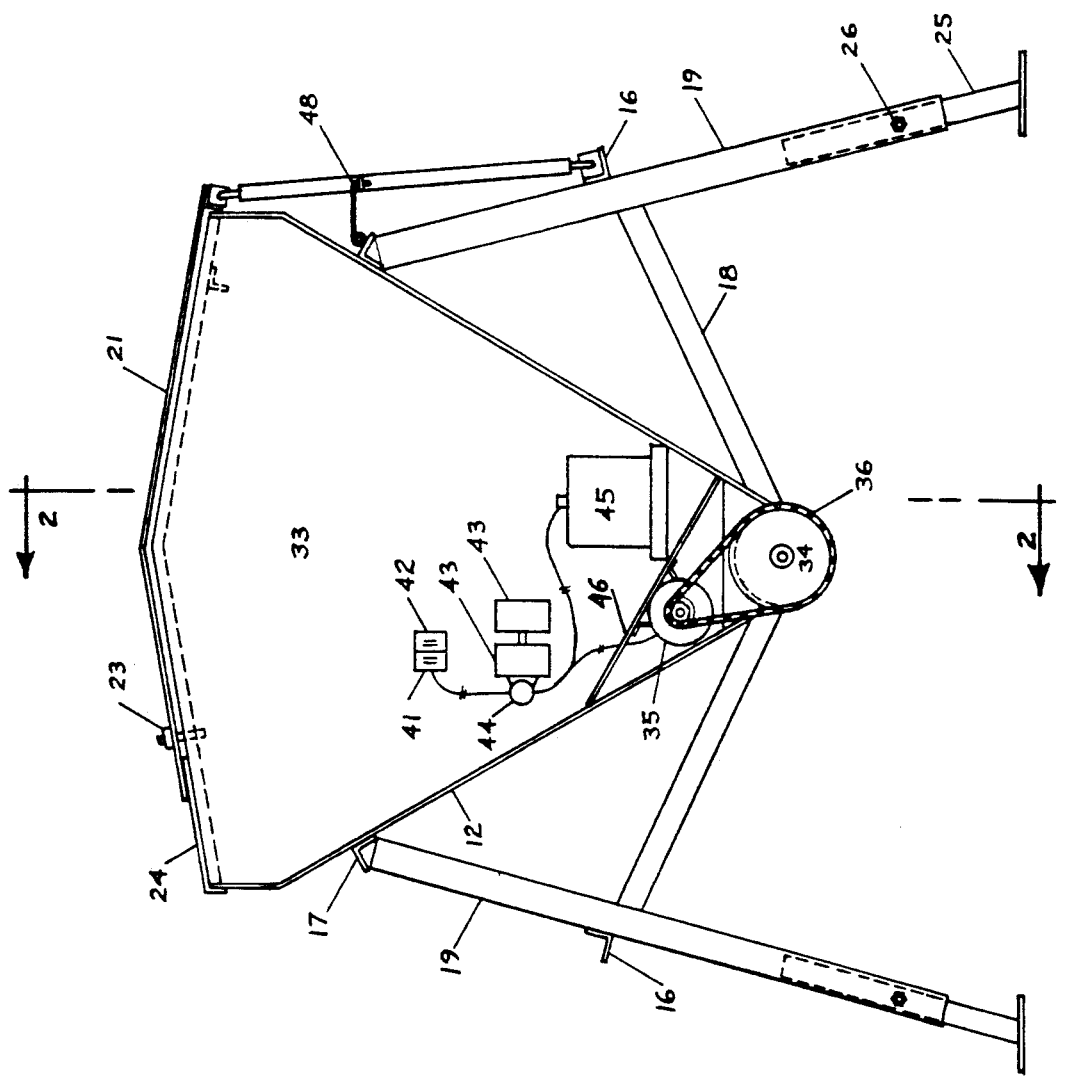
FIG. 3 is an enlarged end view of the apparatus in FIG. 1.

FIG. 3 is an end view of the apparatus showing the power control and input assembly generally at 40 including conventional remote switches 41 and 42, 12-volt D.C. recycling timers 43 such as is available from, e.g., SSAC, Inc., and a solenoid switch 44. A conventional 12-volt direct current storage battery 45 provides the electrical power for the power control and input assembly 40 and to a geared reduction motor 35 such as is available from, e.g., Superwinch, Inc., mounted unto support member 46 for applying power to the power transmitting means including the drive chain 36 and drive sprocket 34 on the conveyor assembly 13 (FIG. 2).

In the setup and operation of a portable automatic animal feeding apparatus, referring to FIG. 1, the apparatus is lifted, for example, by a chain connected to both center main support legs 19 at 47 and over a lifting device such as a conventional tractor loader, is transported, and is longitudinally set over an existing flat feeding surface or feed bunk (not shown) with height and leveling adjustment made at the telescoping square steel tubing 25 and locked in place with set bolts 26 (FIG. 3). The elongated feed storage hopper 11 is then filled with a finely divided dry feed material such as ground grain by first unlocking cover hooks 48 (FIG. 3) and opening obvious hinged sliding covers 21.

In the preferred apparatus as shown in FIGS. 3 and 4, the recycling timer controlled feeding operation begins by setting a remote 2-way power start switch 41 to "OFF" position. Input switches on timers 43 such as recycling timers from SSAC, Inc., are then set to desired time intervals between feeding cycles, and set to desired quantity of feed material dispensed at each feeding cycle by setting duration of conveyor run. With remote 3-way switch 42 set to "AUTO", start switch 41 is set to "ON", and power control means are actuated. Calibration of feed quantity delivered may be done by using "MANUAL" and "OFF" setting on remote 3-way switch 42 without loss of memory to the recycling timers 43.

When a timed feeding cycle begins, the timer load circuit contacts transmitting power to close the solenoid 44 contacts energizing the electrical circuit to the drive motor 35 such as may be obtained from Superwinch, Inc., which drives the chain 36 to drive sprocket 34 for conveyor assembly 13 (FIG. 2) run time.

In FIG. 2, during conveyor assembly 13 run time, feed material is simultaneous carried from a plurality of feed entry ports 27 between hood covers 28 to a plurality of feed exit ports 14 centered beneath hood covers 28 and discharged end to end along the bottom of the elongated feed storage hopper 11 through the feed exit ports 14 and onto a known conventional feeding surface or feed bunk below feeding apparatus by means of the left hand auger flighting 29 and the right hand auger flighting 30 carrying feed material in opposite directions beginning from a center feed entry port 31, until desired quantity of feed material is delivered for animal consumption on both sides of the feeding surface. Feeding cycles repeat as set by input timers 43 (FIG. 3).

It will be apparent to those skilled in the art how various alterations and modifications of the present embodiment may easily be resorted to while still falling within the scope of the invention as described by the following claims.

We claim:

1. An automatic animal feeding apparatus comprising:

a storage means for conveniently storing and for allowing accessible use of large quantities of feed or the like for long periods of time and for ideal use in generally remote areas, said storage means having an elongate storage hopper for storing said feed.

a dispensing means disposed in said feeding apparatus for discharging feed or the like to a feeding surface below said feeding apparatus for feeding said animal or animals, said dispensing means further comprising a conveyor extending longitudinally and rotatably above a bottom of said storage hopper from one end of said storage hopper to the other end thereof, said conveyor having ends journaled in end plates of said storage hopper, said conveyor including a right-hand auger flighting extending from a midpoint thereof to one end thereof and a left-hand auger flighting extending also from a midpoint thereof to the other end thereof for uniformly transferring feed or the like in opposite directions from said midpoint, said dispensing means also having a plurality of longitudinally spaced exit ports through said bottom below said conveyor to discharge said feed to the feeding surface below said bottom of said storage hopper when said conveyor is rotated, and a plurality of hood covers detachably mounted to said side walls and having cross walls sloping downwardly toward said conveyor and sloping generally outwardly toward said adjacent covers, said hood covers positioned above said conveyor and above said feed exit ports to prevent said feed or the like stored in said storage means from unimpeded gravitationally discharging through said exit ports when said conveyor is not being rotated, said covers along with said side walls forming feed entry ports therebetween to facilitate flow of feed to said dispensing means, a stand assembly having a plurality of spaced-apart legs for supporting and elevating said storage means and said dispensing means above the feeding surface, said legs positioned about said storage means and said dispensing means, said stand assembly having a plurality of angle irons connected to and traversing between pairs of legs to elevate and support said and said storage means and said dispensing means, a power transmitting means mounted on said feeding apparatus, and connected to said conveyor for rotation thereof, and a timer means connected to said power transmitting means so that said power transmitting means is alternately turned on and off at pre-determined intervals to meter the quantities of said feed or the like dispensed from said storage means.

* * * * *